United States Patent [19]

Bitterlin et al.

[11] 4,116,624
[45] Sep. 26, 1978

[54] NEW HEAVY METAL COMPLEX DYES, PROCESS FOR THEIR MANUFACTURE AND USE THEREOF

[75] Inventors: Otto Bitterlin, Basel; Fabio Beffa, Riehen, both of Switzerland

[73] Assignee: Ciba-Geigy Corporation, Ardsley, N.Y.

[21] Appl. No.: 737,932

[22] Filed: Nov. 1, 1976

[30] Foreign Application Priority Data

Nov. 18, 1975 [CH] Switzerland ............... 14919/75

[51] Int. Cl.² .................. C09B 45/00; D06P 1/10
[52] U.S. Cl. ............................. 8/42 B; 8/13; 8/43; 8/54; 8/178 R; 260/146 R; 260/146 T; 260/147; 260/148
[58] Field of Search ............ 8/13, 42 B, 54, 43

[56] References Cited

U.S. PATENT DOCUMENTS 3,562,246  2/1971  Barwick et al. ............ 260/148

FOREIGN PATENT DOCUMENTS 818,329  9/1937  France.
1,088,458  10/1967  United Kingdom.

Primary Examiner—A. Lionel Clingman
Attorney, Agent, or Firm—Edward McC. Roberts; Michael W. Glynn

[57] ABSTRACT

The present invention provides heavy metal complexes of azo dyes of the formula

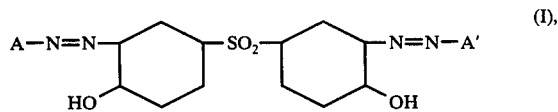

wherein each of A and A' represents a coupling component of the phenylenediamine, naphthol, naphthylamine, pyrazolone, aminopyrazole, acylacetamide, pyridone, 2,4,6-triaminopyridine or barbituric acid series, which is bound in ortho-position to a hydroxy, amino or enolisable keto group to the azo group, while A and A' carry at least one sulpho group and contain no other ionogenic substituents.

3 Claims, No Drawings

NEW HEAVY METAL COMPLEX DYES, PROCESS FOR THEIR MANUFACTURE AND USE THEREOF

The present invention provides heavy metal complexes of azo dyes of the formula

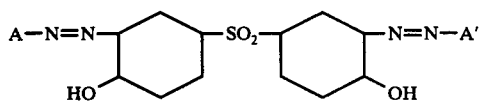

wherein each of A and A' represents a coupling component of the phenylenediamine, naphthol, naphthylamine, pyrazolone, aminopyrazole, acylacetamide, pyridone, 2,4,6-triaminopyridine or barbituric acid series, which is bound in ortho-position to a hydroxy, amino or enolisable keto group to the azo group, whilst A and A' carry at least one sulpho group and contain no other ionogenic substituents.

The radicals A and A' can be different or preferably the same. They can be unsubstituted or substituted by arylazo groups and can contain 1 to 2 sulpho groups. The disazo dyes of the formula (I) are obtained in conventional manner by coupling, in which connection one or more different coupling components can also be used. Suitable coupling components belong chiefly to the following groups:

sulphonaphthols which are unsubstituted or substituted by halogen, in particular chlorine atoms, or by acylamino, amino, sulphonamido, N-mono- or N,N-disubstituted sulphonamido groups and sulphone groups;

sulphonaphthylamines which are unsubstituted or substituted by halogen, in particular bromine atoms, or by methyl, methoxy, sulphonamido, N-mono- or N,N-disubstituted sulphonamido or sulphone groups;

3-methyl-5-pyrazolones or 3-methyl-5-aminopyrazoles which in 1-position contain a sulphophenyl or sulphonaphthyl group which is unsubstituted or substituted by chlorine atoms, nitro groups, lower molecular alkyl and alkoxy groups, sulphonamido or sulphone groups;

acylacetic sulphanilides which can be substituted in the sulphanilide nucleus by chlorine or bromine atoms, low molecular alkyl, alkoxy, sulphonamido or sulphone groups, and which contain as acyl group a benzoyl group or chiefly the acetyl group;

6-hydroxy-3-sulphomethyl-4-alkyl-2-pyridones which are substituted in 1-position by a low molecular substituted or unsubstituted alkyl group, for example a methyl, iso-propyl, β-hydroxyethyl, β-aminoethyl or γ-isopropoxypropyl group; m-phenylenediaminesulphonic acid;

2,4-diamino-5-cyano- or -5-carboxamido-pyridines which contain in 6-position an arylamino group which contains sulpho groups, for example a sulphophenylamino group.

The term "low molecular" used herein denotes that the groups so qualified contain from 1 to 4 carbon atoms.

The term "acylamino" denotes amino groups which are substituted by acyl radicals of aliphatic or aromatic sulphonic and, in particular, carboxylic acids or by monoalkyl or monoaryl esters of carbonic acid.

The term "acyl" thus comprises low molecular alkanoyl, alkoxycarbonyl and alkylsulphonyl groups, such as the acetyl, chloroacetyl, propionyl, butyryl, methoxycarbonyl, ethoxycarbonyl, methylsulphonyl or ethylsulphonyl group, and aroyl, aryloxycarbonyl and arylsulphonyl groups, for example the benzoyl, chlorobenzoyl, methylbenzoyl, nitrobenzoyl, phenylsulphonyl, phenoxycarbonyl or p-methylphenylsulphonyl group. Preferred acylamino groups are low molecular alkanoylamino, alkoxycarbonylamino or optionally substituted benzoylamino groups.

As mono- or disubstituted sulphonamido groups, mention is to be made chiefly of the sulphonamido groups which are substituted by low molecular alkyl, hydroxyalkyl, alkoxyalkyl, cyanoalkyl, aralkyl, cycloalkyl, in particular cyclohexyl, aralkyl, in particular benzyl, groups, or by aryl groups. Suitable sulphone groups are primarily low molecular alkylsulphonyl groups, low molecular alkylsulphonyl, phenylsulphonyl, chlorophenylsulphonyl, nitrophenylsulphonyl, methoxyphenylsulphonyl or benzylsulphonyl groups.

Examples of suitable coupling components are:
1-acetylamino-7-naphthol-3- or 4-sulphonic acid,
1-propionylamino-7-naphthol-3- or 4-sulphonic acid,
1-carbomethoxyamino-7-naphthol-3- or 4-sulphonic acid,
1-carboethoxyamino-7-napthol-3- or 4-sulphonic acid,
1-carbopropoxyamino-7-naphthol-3- or 4-sulphonic acid,
2-naphthol-3-, -4-, -5-, -6-, -7- or -8-sulphonic acid,
1-naphthol-3-, -4- or -5-sulphonic acid,
1-naphthol-3,6- or -3,8-disulphonic acid,
2-naphthol-3,6- or -4,8-disulphonic acid,
2-naphthol-6,8-disulphonic acid,
1-amino-8-hydroxynaphthalene-3,6-disulphonic acid,
1,3-phenylenediamine-4-sulphonic acid,
1-naphthylamine-4-sulphonic acid,
2-aminonaphthalene-6-sulphonic acid,
1-(2'-, 3'- or -4'-sulphophenyl)-3-methyl-pyrazol-5-one,
1-(2'-chloro-5'-sulphophenyl)-3-methyl-pyrazol-5-one,
1-(4'-chloro-3'-sulphophenyl)-3-methyl-pyrazol-5-one,
1-(2', 5'-dichloro-4'-sulphophenyl)-3-methyl-pyrazol-5-one,
1-(2',5'-disulphophenyl)-3-methyl-pyrazol-5-one,
1-(2',4'-disulphophenyl)-3-methyl-pyrazol-5-one,
1-(4'-methyl-3'-sulphophenyl)-3-methyl-pyrazol-5-one,
1-(4'-methoxy-3'-sulphophenyl)-3-methyl-pyrazol-5-one,
1-(2'-, -3'- or -4'-sulphophenyl)-3-methyl-5-aminopyrazole,
1-(2'-chloro-5'-sulphophenyl)-3-methyl-5-aminopyrazole,
acetoacetanilide-3- or -4-sulphonic acid,
acetoacetanilide-4-chloro-3-sulphonic acid,
acetoacetanilide-4-methyl-3-sulphonic acid,
acetoacetanilide-4-methoxy-3-sulphonic acid,
1-ethyl-3-sulphomethyl-4-methyl-6-hydroxypyridone-2,
2,4-diamino-5-cyano-6-(3'-sulphophenylamino)-pyridine.

The dyes of the present invention are obtained by reacting a disazo dye of the formula (I) with a heavy metal donor. Suitable heavy metal donors are, for example, freshly precipitated hydroxides or water-soluble inorganic salts of cobalt, chromium, copper, iron or nickel, in particular the chlorides, fluorides, nitrates or sulphates, for example cobalt(II) sulphate, chromium-(III) chloride, copper sulphate or nickel sulphate. Chroming can also be effected with chromates in the presence of a reducing agent. The disazo dyes are reacted with the metallising agents in the ratio 1:1 or 1:2 under the conditions normally employed for these metallising reactions.

Preferred groups of coupling components are:
aminopyrazoles and pyrazolones of the formula

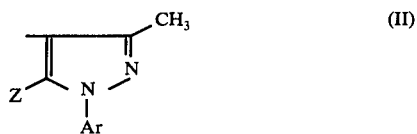

wherein Z is the OH or NH$_2$ group and Ar is a sulphophenyl group which is unsubstituted or substituted by halogen atoms, in particular chlorine atoms, or by low molecular alkyl or alkoxy groups;
acetoacetanilides of the formula

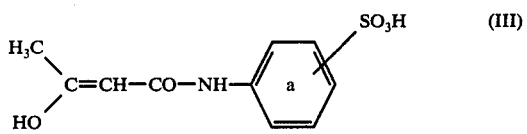

wherein the ring $a$ can be substituted by chlorine or bromine atoms, or low molecular alkyl or alkoxy groups; hydroxynaphthalene-mono- or -disulphonic acids. The metal complexes of the present invention are suitable for dyeing and printing a variety of organic materials. They are leather and textile dyes which are suitable for dyeing wool, silk and synthetic polyamide materials, but especially leather and furs.

The dyes of the present invention are characterised chiefly by their good penetrating and covering properties and by their good fastness to diffusion on leather. In addition, they yield level dyeings of good fastness to light, washing, water, perspiration, acid, alkali and rubbing. The shades which can be obtained range from yellow to black.

In the following illustrative but non-limitative Examples the parts and percentages are by weight, unless otherwise indicated.

EXAMPLE 1

Cobalt complex of

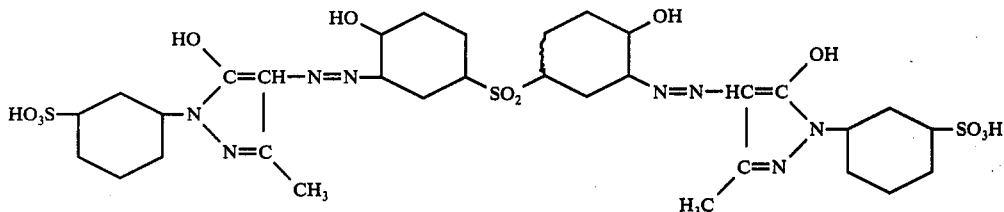

28 Parts of 4,4'-dihydroxy-3,3'-diaminodiphenylsulphone are tetrazotised by dropping the aqueous solution of the disodium salt and 13.8 parts of sodium nitrite in the course of half an hour into a 5°–10° C warm solution of 48 parts by volume of 10 N hydrochloric acid and 100 parts of water. The suspension of the tetrazonium compound is stirred for 2 hours. After destroying any excess nitrite with sulphamic acid, coupling is effected by adding dropwise the suspension of the tetrazonium compound at 15°–20° C in the course of 1 hour to the solution of the sodium salt of 51.2 parts of 1-(3'-sulphophenyl)-3-methylpyrazolone in water which has been adjusted to a pH-value of 4.5 with acetic acid. The pH of the reaction mixture is kept constant by adding sodium carbonate solution and stirring is continued until the coupling is complete. Thereafter the gelatinous precipitated disazo dye is adjusted to a pH of 7.5 with 10 N sodium hydroxide solution and heated to 60° C. After addition of sodium chloride the batch is stirred for 1 to 2 hours, then the brownish orange dye is collected by filtration, washed with a dilute solution of sodium chloride and dried at 60°–70° C in vacuo.

81 Parts of the above disazo dye are dissolved at 80° C in 1300 parts of water and 2.5 N sodium hydroxide solution is added until a pH value of 8.5 is attained. At the same temperature 30 parts of tartaric acid are added to the solution and the pH is kept constant between 8 and 9 by addition of 2.5 N sodium hydroxide solution. To this solution are thereafter added 31 parts of cobalt sulphate heptahydrate while continuing to keep the pH between 8 and 9 by adding 2.5 N sodium hydroxide solution. The mixture is stirred at approx. 80° C until no more starting material can be detected. The cobalt complex is salted out with sodium chloride and collected by filtration. The sodium salt of the cobalt complex of the dye acid of the above formula is a brown powder which dissolves in water to give a reddish orange solution and in concentrated sulphuric acid to give a dark yellow solution. The dye colours chromium velour leather and chromium grained leather in level brownish orange shades of good fastness to light and diffusion and good covering capacity.

EXAMPLE 2

Iron complex of the disazo compound of Example 1

81 Parts of the disazo dye obtained from 4,4'-dihydroxy-3,3'-diaminodiphenylsulphone and 1-(3'-sulphophenyl)-3-methyl-pyrazolone (prepared in accordance with the particulars of Example 1) are suspended at room temperature in 1500 parts of water. The suspension is adjusted with 1 N sodium hydroxide solution to pH 7.5 and then 21.5 parts of ferrisulphate and sufficient 40% sodium acetate to adjust the pH to 4–4.5 are added. The mixture is subsequently heated to approx. 80° C in the course of ½ hour and stirred at this temperature until the complexing is complete. The reaction mass is adjusted at room temperature to pH 4–4.5 with 1 N sodium hydroxide solution and the iron complex is salted out with a mixture of sodium and potassium chloride and collected by filtration. The mixture of the sodium and potassium salts of the dye acid of this iron complex is a brown powder which dissolves in water to give a brown solution and in concentrated sulphuric acid to give a yellow solution. Chromium velour leather or chromium grained leather is dyed with this product in level olive brown shades of good fastness to diffusion and light and good covering capacity.

EXAMPLE 3

Cobalt complex of

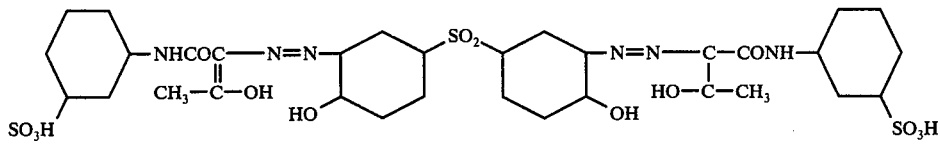

28 Parts of 4,4'-dihydroxy-3,3'-diaminodiphenylsulphone are tetrazotised in accordance with the particulars of Example 1. After excess nitrite has been destroyed with sulphamic acid, the aqueous tetrazonium compound is added dropwise in the course of 1 hour at 15° to 20° C to a solution of the sodium salt of 54 parts of 3-acetoacetylaminobenzene-1-sulphonic acid in 500 parts of water whilst keeping the pH between 8 and 8.5 by adding a 20% solution of sodium carbonate. When the coupling is complete, the yellow disazo dye is salted out with a dilute solution of sodium chloride and dried in vacuo at 60°–70° C.

The sodium salt of the cobalt complex of the dye acid of the above formula is obtained by stirring 81.6 parts of the above disazo dye under the process conditions described in Example 1 together with cobalt sulphate heptahydrate for several hours at approx. 80° C, salting out the cobalt complex with sodium chloride and collecting it by filtration. The dye is a light brown powder which dissolves in water to give a yellow solution and in concentrated sulphuric acid to give a light yellow solution. It dyes chromium velour leather and chromium grained leather in level shades of exceptional lightfastness, good fastness to diffusion and good covering properties.

EXAMPLE 4

Copper complex of adjusted to a pH of approx. 1.5 with 10 N hydrochloric acid. The reaction mass is heated in the course of ½ hour to 60°–70° C, stirred at this temperature, and the pH is kept constantly between 2 and 2.5 until the coupling is complete by adding a 40% solution of sodium acetate. The resultant yellow disazo dye is precipitated at room temperature with sodium chloride and dimethyl formamide, collected by filtration and washed with a mixture of a dilute solution of sodium chloride and dimethyl formamide which has a pH of 2.5. The product is purified by reprecipitation from the aqueous solution of the sodium salt by addition of sodium chloride and dimethyl formamide. The disazo dye is dried at 60°–70° C in vacuo.

80.8 Parts of the above disazo dye are dissolved in 3000 parts of warm water of 70° C at a pH of 7.5. The dye solution is adjusted with 40% acetic acid to a pH of approx. 4.5. Then 10 parts of sodium acetate are added thereto and subsequently 500 parts of a 10% solution of copper sulphate are added dropwise to the resultant apparent solution at approx. 50° C in the course of 1 to 2 hours. The copper complex is precipitated with sodium chloride, collected by suction filtration and washed with an acetic acid solution of sodium chloride. The sodium salt of the copper complex of the dye acid of the above formula -a brown powder- dissolves in water to give a yellowish brown solution and in concentrated sulphuric acid to give a brownish yellow solution. This product dyes chromium velour leather or chromium grained leather in level light brown shades of both good fastness to light and diffusion and of good covering capacity.

EXAMPLE 5

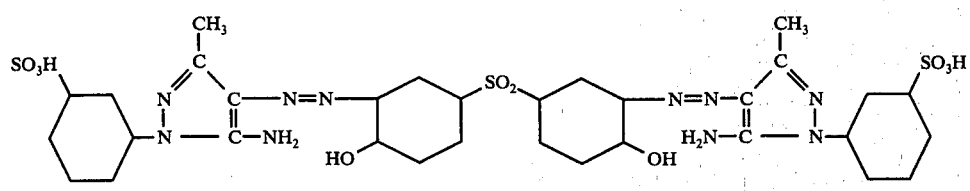

28 Parts of 4,4'-dihydroxy-3,3'-diaminodiphenylsulphone are tetrazotised in accordance with the particulars of Example 1 and, upon completion of the reaction, any excess nitrite is destroyed with sulphamic acid. The suspension of the tetrazonium compound is subsequently added dropwise at 15°–20° C in the course of ½ hour to a solution of 53.1 parts of 1-(3'-sulphophenyl)-3-methyl-5-iminopyrazole and 41.6 parts of naphthalene-2-sulphonic acid in 800 parts of water which has been Cobalt of complex of

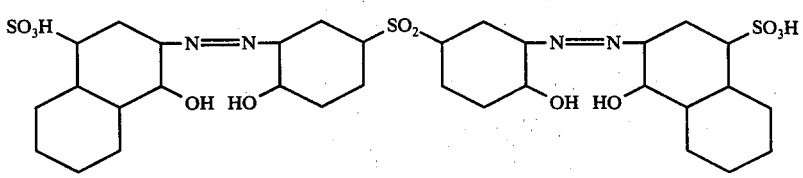

28 Parts of 4,4'-dihydroxy-3,3'-diaminodiphenylsulphone are tetrazotised in accordance with the particulars of Example 1. Any excess nitrite is destroyed with sulphamic acid and the aqueous suspension of the tetrazonium compound is coupled by adding it dropwise to a solution of the sodium salt of 47 parts of 1-oxynaphthalene-4-sulphonic acid in 500 parts of water at 0°–5° C and a pH of 9.5 in the course of 1 hour. The pH is kept between 9.5 and 10 by adding 10 N sodium hydroxide solution. When the coupling is complete, the violet disazo dye is precipitated at pH 1.5 and, after addition of dimethyl formamide, collected by filtration and washed with a mixture of an acid dilute solution of sodium chloride and dimethyl formamide. The product is purified by isolating once more the sodium salt of the dye acid from the aqueous suspension with sodium chloride and dimethyl formamide. The dye is dried in vacuo at 60°–70° C.

75 Parts of the above disazo dye are stirred under the process conditions described in Example 1 at approx. 80° C with cobalt sulphate heptahydrate until the complexing is complete. The cobalt complex is precipitated with sodium chloride, collected by filtration and washed with a dilute solution of sodium chloride. The sodium salt of the cobalt complex of the dye acid is a brown powder which dissolves in water to give a claret coloured solution and in concentrated sulphuric acid to give a red solution. The dye colours chromium velour leather and chromium grained leather in level reddish violet shades of notable lightfastness and good fastness to diffusion combined with good covering capacity.

Dyes with similar properties are obtained by reacting the disazo dyes obtained from 4,4'-dihydroxy-3,3'-diaminodiphenylsulphone and the coupling components listed in column I of the following table with the metallising agents which yield the metals listed in column II.

| No. | I Coupling Component | II Metal | III Shade on leather |
|---|---|---|---|
| 1 | 1-(4'-sulphophenyl)-3-methylpyrazol-5-one | Cu | matt orange |
| 2 | " | Ni | yellowish orange |
| 3 | " | Cr | scarlet |
| 4 | " | Fe | yellowish olive |
| 5 | " | Co | matt orange |
| 6 | 1-(3'-sulphophenyl)-3-methylpyrazol-5-one | Cr | scarlet |
| 7 | 1-(2',5'-disulphophenyl)-3-methylpyrazol-5-one | Cu | yellowish orange |
| 8 | " | Ni | yellowish orange |
| 9 | " | Cr | orange |
| 10 | " | Fe | yellowish olive |
| 11 | " | Co | orange |
| 12 | 1-(2'-chloro-5'-sulphophenyl)-3-methyl-pyrazol-5-one | Cu | orange |
| 13 | " | Ni | yellowish orange |
| 14 | " | Cr | scarlet |
| 15 | " | Fe | olive brown |
| 16 | " | Co | orange |
| 17 | 1-(2'-chloro-5'-sulphophenyl)-3-methyl-5-iminopyrazole | Cu | brown |
| 18 | " | Ni | yellowish brown |
| 19 | " | Cr | claret |
| 20 | " | Fe | brown |
| 21 | " | Co | reddish brown |
| 22 | 1-(2,5'-dichloro-4-sulphophenyl)-3-methyl-pyrazol-5-one | Cu | yellowish orange |
| 23 | " | Ni | yellowish orange |
| 24 | " | Cr | orange |
| 25 | " | Fe | yellowish olive |
| 26 | " | Co | yellowish orange |
| 27 | acetoacetanilide-m-sulphonic acid | Cu | yellow |
| 28 | " | Ni | yellow |
| 29 | " | Cr | yellowish orange |
| 30 | " | Fe | yellowish brown |
| 31 | 2,4-diamino-5-cyano-6-(m-sulphophenylamino)-pyridine | Cr | violetish brown |
| 32 | 1-(3'-sulphophenyl)-3-methyl-5-iminopyrazole | Co | reddish brown |
| 33 | " | Ni | brownish orange |
| 34 | " | Cr | clared |
| 35 | " | Fe | yellowish brown |
| 36 | 1-hydroxynaphthalene-4-sulphonic acid | Cu | violet brown |
| 37 | " | Ni | clared |
| 38 | " | Cr | violet |
| 39 | " | Fe | yellowish dark brown |
| 40 | 2-hydroxynaphthalene-6-sulphonic acid | Cu | clared |
| 41 | 2-hydroxynaphthalene-6-sulphonic acid | Ni | brown |
| 42 | " | Cr | violet grey |
| 43 | " | Co | reddish violet |
| 44 | " | Fe | dark brown |
| 45 | 1-hydroxynaphthalene-5-sulphonic acid | Cu | deep purplish red |
| 46 | " | Ni | deep purplish red |
| 47 | " | Cr | violet blue |
| 48 | " | Co | deep purplish red |
| 49 | " | Fe | yellowish dark brown |
| 50 | 1-hydroxy-6-acetyl-amino-naphthalene-3-sulphonic acid | Cu | deep purplish red |
| 51 | " | Ni | reddish brown |
| 52 | " | Cr | bluish grey |
| 53 | " | Co | matt reddish violet |
| 54 | " | Fe | yellowish brown |
| 55 | 1-hydroxy-8-acetyl-amino-naphthalene-3,6-disulphonic acid | Cu | violet |
| 56 | " | Ni | " |
| 57 | " | Cr | blue |
| 58 | " | Co | violet |
| 59 | " | Fe | violet brown |
| 60 | 2-hydroxynaphthalene-7-sulphonic acid | Cu | |
| 61 | " | Ni | reddish brown |
| 62 | " | Cr | violet grey |
| 63 | " | Co | violet red |
| 64 | " | Fe | yellowish brown |
| 65 | 1-hydroxy-7-acetyl-amino-naphthalene-3-sulphonic acid | Cu | deep purplish red |
| 66 | 1-hydroxy-7-acetyl-amino-naphthalene-3-sulphonic acid | Ni | brownish red |
| 67 | " | Cr | dark blue |
| 68 | " | Co | violet brown |
| 69 | " | Fe | yellowish blue |
| 70 | 1-(3'-sulphophenyl)-3-methylpyrazol-5-one | Cu | brownish orange |
| 71 | 1-(3'-sulphophenyl)-3-methylpyrazol-5-one | Ni | brownish orange |
| 72 | 1-hydroxy-7-amino-naphthalene-3-sulphonic acid | Cu | claret |
| 73 | " | Cr | matt black |
| 74 | " | Co | matt brown |
| 75 | " | Fe | brown |
| 76 | 1,3-phenylenediamine-4-sulphonic acid | Cu | reddish brown |
| 77 | " | Ni | yellowish brown |
| 78 | " | Cr | violet brown |
| 79 | " | Co | violet brown |
| 80 | " | Fe | moderate brown |
| 81 | 1-hydroxynaphthalene-3,8-disulphonic acid | Cu | bluish red |
| 82 | " | Cr | matt blue |
| 83 | " | Co | claret |
| 84 | " | Fe | brown |
| 85 | 1-hydroxy-3-sulpho-5-(3'-sulphophenylazo)-6-aminonaphthalene | Cu | bluish violet |
| 86 | " | Cr | matt blue |
| 87 | " | Co | brownish violet |
| 88 | " | Fe | matt brown |

DIRECTIONS FOR DYEING LEATHER

Grained Leather

100 Parts of chromium-tanned neutralised cowhide are constantly agitated for 30 minutes in a dye liquor of 300 parts of water of 50° C and 1 part of dye. The bath is then liquor-fatted for a further 30 minutes with a leather fat liquor and thereafter acidified with 0.5 part of 85% formic acid. Agitation is continued for a further 20 minutes. Finally, the leather is slightly squeezed out and dried.

Velour Leather

100 Parts of dry chromium-tanned skivers (calf) are agitated for 60 minutes in 1000 parts of water of 60° C, to which 2 parts of 24% ammonia are added, in order to wet the fibres.

For dyeing, a bath is prepared from 1000 parts of water of 50° C and 2 parts of 24% ammonia and 4 parts of dye. The wet leather is then put into this bath and agitated constantly for 60 minutes. The bath is subsequently acidified with 2 parts of 85% formic acid and agitation is continued for a further 30 minutes.

The skivers are then rinsed in cold water and dried.

We claim:

1. In a process for dyeing and printing natural or synthetic polyamide materials, the improvement wherein the dyestuff is a cobalt, chromium, copper, iron or nickel metal complex of an azo dye of the formula

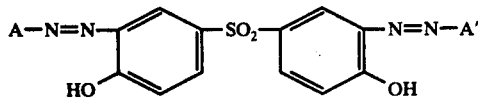

wherein each of A and A' represents a radical of the formula

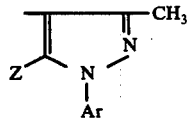

where Z is —OH or —NH$_2$, and

Ar is sulfophenyl which is unsubstituted or substituted by halo, alkyl or alkoxy.

2. In a process for dyeing and printing natural or synthetic polyamide materials, the improvement wherein the dyestuff is a cobalt, chromium, copper, iron or nickel metal complex of an azo dye of the formula

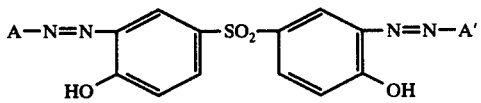

wherein each of A and A' represents the radical of hydroxynaphthalenemono-or-disulfonic acid.

3. In a process for dyeing and printing natural or synthetic polyamide materials, the improvement wherein the dyestuff is a cobalt, chromium, copper, iron or nickel metal complex of an azo dye of the formula

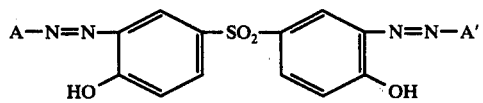

wherein each of A and A' represents a radical of the formula

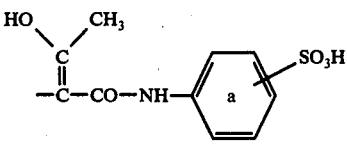

wherein the ring $a$ is further unsubstituted or substituted by chloro or bromo, or by low molecular alkyl or alkoxy.

* * * * *